United States Patent
Eom et al.

(10) Patent No.: US 10,940,760 B2
(45) Date of Patent: Mar. 9, 2021

(54) DEVICE FOR CONTROLLING VEHICLE DISPLAY DEVICE, SYSTEM HAVING THE SAME, AND METHOD FOR CONTROLLING VEHICLE DISPLAY DEVICE

(71) Applicants: Hyundai Motor Company, Seoul (KR); KIA Motors Corporation, Seoul (KR)

(72) Inventors: Ki Tae Eom, Incheon (KR); Man Oh Hong, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 53 days.

(21) Appl. No.: 16/235,404

(22) Filed: Dec. 28, 2018

(65) Prior Publication Data

US 2020/0114763 A1 Apr. 16, 2020

(30) Foreign Application Priority Data

Oct. 16, 2018 (KR) .................. 10-2018-0123046

(51) Int. Cl.
| | |
|---|---|
| *B60K 37/06* | (2006.01) |
| *G06F 3/0484* | (2013.01) |
| *B60K 35/00* | (2006.01) |
| *B60K 37/04* | (2006.01) |

(52) U.S. Cl.
CPC .............. *B60K 37/06* (2013.01); *B60K 35/00* (2013.01); *B60K 37/04* (2013.01); *G06F 3/0484* (2013.01); *B60K 2370/11* (2019.05); *B60K 2370/1533* (2019.05); *B60K 2370/1876* (2019.05); *B60K 2370/195* (2019.05); *B60K 2370/52* (2019.05); *B60K 2370/67* (2019.05)

(58) Field of Classification Search
CPC .......................... B60K 37/06; B60K 2370/52; B60K 2370/11; B60K 2370/67; B60K 2370/1533; B60K 2370/1876; B60K 2370/195; B60K 37/04; B60K 35/00; G06F 3/0484; G06F 1/1652
See application file for complete search history.

(56) References Cited

U.S. PATENT DOCUMENTS

| | | | | |
|---|---|---|---|---|
| 3,672,446 A | * | 6/1972 | Tibbetts | B21C 37/225 |
| | | | | 165/183 |
| 3,735,465 A | * | 5/1973 | Tibbetts | B21C 37/225 |
| | | | | 29/726 |
| 3,877,128 A | * | 4/1975 | Tibbetts | B21C 37/225 |
| | | | | 29/890.046 |
| 5,551,477 A | * | 9/1996 | Kanno | F16K 31/52491 |
| | | | | 137/553 |

(Continued)

FOREIGN PATENT DOCUMENTS

| | | | |
|---|---|---|---|
| CN | 107527552 A | * 12/2017 | ........... G06F 1/1652 |
| EP | 2112583 A1 | * 10/2009 | ......... G06F 3/04886 |

(Continued)

*Primary Examiner* — Behrang Badii
*Assistant Examiner* — Jalal C Coduroglu
(74) *Attorney, Agent, or Firm* — Brinks Gilson & Lione

(57) ABSTRACT

A device for controlling a vehicle display device may include: a processor to determine a vehicle driving condition, and adjust a screen size of the vehicle display device based on the determined vehicle driving condition; and a storage to store information determined by the processor.

10 Claims, 14 Drawing Sheets

(56) References Cited

U.S. PATENT DOCUMENTS

| | | | | |
|---|---|---|---|---|
| 6,041,635 A * | 3/2000 | Cattaneo | B21B 17/04 | |
| | | | 72/235 | |
| 7,126,583 B1 * | 10/2006 | Breed | B60K 35/00 | |
| | | | 345/158 | |
| 7,489,303 B1 * | 2/2009 | Pryor | B60K 35/00 | |
| | | | 345/173 | |
| 8,130,241 B2 * | 3/2012 | Plut | H04N 9/3185 | |
| | | | 345/629 | |
| 8,830,141 B2 * | 9/2014 | Seder | G02B 1/113 | |
| | | | 345/7 | |
| 8,842,425 B2 * | 9/2014 | Ryu | H04M 1/0268 | |
| | | | 361/679.27 | |
| 9,143,588 B2 * | 9/2015 | Ohsaki | G06F 3/0489 | |
| 9,189,028 B2 * | 11/2015 | Nakhimov | G06F 3/03543 | |
| 9,229,735 B2 * | 1/2016 | Plut | H04N 9/3188 | |
| 9,258,396 B2 * | 2/2016 | Hwang | G06F 1/1677 | |
| 9,459,452 B2 * | 10/2016 | Hada | G03B 21/2033 | |
| 9,495,080 B2 * | 11/2016 | Mockli | G06F 3/0486 | |
| 9,513,744 B2 * | 12/2016 | Pryor | G06F 3/0425 | |
| 9,524,049 B2 * | 12/2016 | Yun | G06F 3/0488 | |
| 9,527,386 B2 * | 12/2016 | Lee | B60K 37/06 | |
| 9,688,145 B2 * | 6/2017 | Kang | B60K 35/00 | |
| 9,688,146 B2 * | 6/2017 | Kim | B60K 37/04 | |
| 9,718,360 B2 * | 8/2017 | Yang | G06F 3/04886 | |
| 9,830,840 B2 * | 11/2017 | Yoshizumi | B60K 37/06 | |
| 9,860,474 B2 * | 1/2018 | Park | H04N 21/4884 | |
| 9,903,732 B2 * | 2/2018 | van Os | G06F 3/3209 | |
| 10,019,413 B2 * | 7/2018 | Beck | G06F 3/0484 | |
| 10,043,858 B2 * | 8/2018 | Miyake | H01L 27/3265 | |
| 10,216,398 B2 * | 2/2019 | Woo | G09G 5/373 | |
| 10,471,894 B2 * | 11/2019 | Kim | B60R 1/00 | |
| 10,510,276 B1 * | 12/2019 | Lee | G09G 3/001 | |
| 10,663,970 B2 * | 5/2020 | Park | H04W 4/021 | |
| 2002/0085043 A1 * | 7/2002 | Ribak | B60K 35/00 | |
| | | | 715/810 | |
| 2004/0189234 A1 * | 9/2004 | Fukasawa | G05B 19/409 | |
| | | | 318/649 | |
| 2006/0164230 A1 * | 7/2006 | DeWind | B60K 35/00 | |
| | | | 340/461 | |
| 2006/0208638 A1 * | 9/2006 | Yoo | H01J 11/24 | |
| | | | 313/585 | |
| 2007/0171142 A1 * | 7/2007 | Ikarashi | B60K 37/02 | |
| | | | 345/4 | |
| 2007/0268415 A1 * | 11/2007 | Ukyou | H04S 7/30 | |
| | | | 348/760 | |
| 2009/0265662 A1 * | 10/2009 | Bamford | G06F 3/04886 | |
| | | | 715/800 | |
| 2011/0320088 A1 * | 12/2011 | Eom | B60K 35/00 | |
| | | | 701/34.4 | |
| 2013/0050276 A1 * | 2/2013 | Moriya | G05B 19/4069 | |
| | | | 345/672 | |
| 2014/0267082 A1 * | 9/2014 | Peterson | G06F 3/041661 | |
| | | | 345/173 | |
| 2014/0309864 A1 * | 10/2014 | Ricci | G05D 23/1917 | |
| | | | 701/36 | |
| 2014/0375596 A1 * | 12/2014 | Kim | G06F 3/1446 | |
| | | | 345/174 | |
| 2015/0153936 A1 * | 6/2015 | Lim | G06F 3/04883 | |
| | | | 715/716 | |
| 2015/0177591 A1 * | 6/2015 | Sugiyama | G02B 27/0093 | |
| | | | 359/298 | |
| 2015/0258895 A1 * | 9/2015 | Bouaziz | H01H 19/11 | |
| | | | 701/36 | |
| 2015/0293632 A1 * | 10/2015 | Bullock | G06F 3/0488 | |
| | | | 345/174 | |
| 2016/0054758 A1 * | 2/2016 | Han | G06F 1/1652 | |
| | | | 361/679.26 | |
| 2016/0077652 A1 * | 3/2016 | Yang | G06F 3/04886 | |
| | | | 345/174 | |
| 2016/0077688 A1 * | 3/2016 | Shim | G06F 3/04847 | |
| | | | 715/771 | |
| 2016/0132281 A1 * | 5/2016 | Yamazaki | G06F 3/0446 | |
| | | | 345/1.3 | |
| 2016/0142689 A1 * | 5/2016 | Karikomi | H04N 9/3155 | |
| | | | 348/745 | |
| 2016/0159218 A1 * | 6/2016 | Kang | B60K 35/00 | |
| | | | 701/36 | |
| 2016/0176372 A1 * | 6/2016 | Kim | B60K 35/00 | |
| | | | 701/49 | |
| 2016/0306534 A1 * | 10/2016 | Woo | G09G 5/373 | |
| 2016/0311323 A1 * | 10/2016 | Lee | B60K 35/00 | |
| 2017/0011210 A1 * | 1/2017 | Cheong | G06F 21/32 | |
| 2017/0018250 A1 * | 1/2017 | Shai | G06F 1/1656 | |
| 2017/0075155 A1 * | 3/2017 | Oikawa | G02F 1/1368 | |
| 2017/0101111 A1 * | 4/2017 | Fung | B60W 50/14 | |
| 2017/0124987 A1 * | 5/2017 | Kim | B60R 11/04 | |
| 2017/0293198 A1 * | 10/2017 | Kim | G02B 5/003 | |
| 2017/0293199 A1 * | 10/2017 | Kim | H04N 13/239 | |
| 2017/0322760 A1 * | 11/2017 | Soh | B60K 37/06 | |
| 2017/0330464 A1 * | 11/2017 | Yoo | B33Y 50/02 | |
| 2017/0349098 A1 * | 12/2017 | Uhm | G01F 1/665 | |
| 2017/0361759 A1 * | 12/2017 | Kim | A61J 7/0076 | |
| 2017/0367198 A1 * | 12/2017 | Park | H01L 51/5237 | |
| 2018/0009367 A1 * | 1/2018 | Lee | A61B 8/485 | |
| 2018/0014182 A1 * | 1/2018 | Jaegal | H04W 8/22 | |
| 2018/0079306 A1 * | 3/2018 | Kim | B60K 35/00 | |
| 2018/0093611 A1 * | 4/2018 | Kim | B60R 1/00 | |
| 2018/0119808 A1 * | 5/2018 | Miller | B60W 10/02 | |
| 2018/0201207 A1 * | 7/2018 | Kim | B60K 37/06 | |
| 2018/0210210 A1 * | 7/2018 | Yamamura | B60R 1/001 | |
| 2018/0217670 A1 * | 8/2018 | Cho | B60K 35/00 | |
| 2018/0239511 A1 * | 8/2018 | No | G06F 3/0482 | |
| 2018/0262708 A1 * | 9/2018 | Lee | H04N 21/475 | |
| 2018/0275414 A1 * | 9/2018 | Tanaka | G02B 27/0179 | |
| 2018/0341142 A1 * | 11/2018 | Choi | G06F 1/1643 | |
| 2019/0095227 A1 * | 3/2019 | Hwang | G06K 9/00087 | |
| 2019/0149607 A1 * | 5/2019 | Shim | G06F 8/65 | |
| | | | 307/10.1 | |
| 2020/0101842 A1 * | 4/2020 | Adithya | B60K 35/00 | |
| 2020/0114763 A1 * | 4/2020 | Eom | B60K 37/06 | |

FOREIGN PATENT DOCUMENTS

| | | | | |
|---|---|---|---|---|
| EP | 3261084 A1 * | 12/2017 | | H04M 1/0268 |
| JP | 2016035563 A * | 3/2016 | | G09F 9/301 |
| JP | 2017227863 A * | 12/2017 | | H05K 5/0017 |
| RU | 2632413 C2 * | 10/2017 | | G06F 1/1652 |
| WO | WO-2013081622 A1 * | 6/2013 | | G06F 1/1616 |
| WO | WO-2013180407 A1 * | 12/2013 | | G06F 3/0484 |
| WO | WO-2016075589 A1 * | 5/2016 | | G06F 1/1643 |

* cited by examiner

DEVICE FOR CONTROLLING VEHICLE DISPLAY DEVICE, SYSTEM HAVING THE SAME, AND METHOD FOR CONTROLLING VEHICLE DISPLAY DEVICE

CROSS-REFERENCE TO RELATED APPLICATION

This application claims priority to and the benefit of Korean Patent Application No. 10-2018-0123046, filed on Oct. 16, 2018, the entire contents of which are incorporated herein by reference.

FIELD

The present disclosure relates to a device for controlling a vehicle display device, a system including the same, and a method for controlling the vehicle display device.

BACKGROUND

The statements in this section merely provide background information related to the present disclosure and may not constitute prior art.

A vehicle has been developed to provide a more comfortable and safe driving environment to a driver. Recently, many safety control systems have been developed to improve safety and convenience of the driver. Especially, an autonomous driving vehicle that may autonomously travel to a destination without driver's manipulation is actively studied.

A display that displays driving information for assisting the driver in driving is mounted in the vehicle. We discovered that when a size of the display is increased to provide more information to the driver, the display obstructs driver's field of vision. In addition, as various devices for controlling the vehicle are installed in the vehicle, when the screen size of the vehicle display device is increased, a front of the vehicle becomes more complex, and the display device needs a more area for installation.

SUMMARY

The present disclosure addresses the above-mentioned problems occurring in the prior art while advantages achieved by the prior art are maintained intact.

An aspect of the present disclosure provides a device for controlling a vehicle display device, a system having the same, and a method for controlling the vehicle display device, by which a rollable type of a display provides a user-customized display size depending on an autonomous driving mode and a normal driving mode.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a processor configured to adjust a screen size of the vehicle display device based on a vehicle driving condition or an input from a user; and a storage configured to store information determined by the processor may be included.

In one form, when a vehicle starting is disabled, or when the vehicle driving condition is an autonomous driving mode, the processor may be further configured to turn off the vehicle display device.

In one form, when the vehicle driving condition is a normal driving mode or when an autonomous driving mode of the vehicle is deactivated, the processor may be further configured to enlarge the screen size of the vehicle display device into a first stage size in a first direction.

In one form, when the vehicle driving condition is a normal driving mode, or an autonomous driving mode is deactivated, and when use of a navigation function or a multimedia function is requested from the user, the processor may be configured to enlarge the screen size of the vehicle display device into a first stage size in a first direction and further enlarge the first stage size into a second stage size in the first direction.

In one form, after an autonomous driving mode is deactivated, and when use of a navigation function or a multimedia function, and a rear side monitoring function are requested from the user, the processor may be configured to: enlarge the screen size of the vehicle display device into a first stage size in a first direction, and subsequently enlarge the first stage size of the screen size into a second stage size in the first direction; and further enlarge the second stage size of the screen size of the vehicle display device into the second stage size into a third stage size in a second direction.

In one form, the first direction and the second direction may be opposite to each other.

In one form, the processor may be configured to adjust the screen size of the vehicle display device depending on the input from the user when the vehicle is in a normal driving mode.

In one form, when a use of a rear side monitoring function is requested from the user, the processor may be further configured to enlarge the screen size of the vehicle display device into a third stage size in a second direction.

In one form, when a rear monitoring switch is turned on or a left-turn signal is activated, the processor may be configured to determine that request of use of the rear side monitoring function has occurred.

In one form, when, after deactivation of the autonomous driving mode, request from the user to use a rear side monitoring function is received without a request to use a navigation function or a multimedia function, the processor may be further configured to enlarge the screen size of the vehicle display device into the first stage size in the first direction, and then subsequently into a third stage size.

According to an aspect of the present disclosure, a vehicle system may include: a vehicle display device configured to roll a display screen; and a controlling device configured to control the vehicle display device, wherein the controlling device is configured to adjust a screen size of the vehicle display device based on a vehicle driving condition or an input from a user of the vehicle.

In one form, the vehicle display device may include: a first display screen to be enlarged in a first direction; a second display screen to be enlarged in a second direction; and a rod-shaped rolling mechanism configured to roll the first display screen and the second display screen therein.

In one form, the rod-shaped rolling mechanism may include: a driving motor configured to extend and roll the first display screen and the second display screen; a rail moving portion configured to fix the first and second display screens thereto, wherein the rail moving portion is movable by the driving motor; and a rail body surrounding the rail moving portion.

According to an aspect of the present disclosure, a method for controlling a vehicle display device may include: determining, by a processor, a vehicle driving condition; and adjusting, by the processor, a screen size of a vehicle display device based on the determined vehicle driving condition, or a user input.

In one form, adjusting the screen size of the vehicle display device may include: when a vehicle starting is disabled, or when the vehicle driving condition is an autonomous driving mode, turning off the vehicle display device.

In one form, adjusting the screen size of the vehicle display device may include: when the vehicle driving condition is a normal driving mode or an autonomous driving is deactivated, enlarging the screen size of the vehicle display device into a first stage size in a first direction.

In one form, adjusting the screen size of the vehicle display device may include: after an autonomous driving mode is deactivated, and when use of a navigation function or a multimedia function is requested from the user, enlarging the screen size of the vehicle display device into a first stage size in a first direction; and subsequently enlarging the first stage size of the screen size into a second stage size in the first direction.

In one form, adjusting the screen size of the vehicle display device may include: after an autonomous driving mode is deactivated, and when use of a navigation function or a multimedia function, and a rear side monitoring function are requested from the user, enlarging the screen size of the vehicle display device into a first stage size in a first direction; subsequently enlarging the first stage size of the screen size into a second stage size in the first direction; and enlarging the second stage size of the screen size of the vehicle display device into a third stage size in a second direction.

In one form, adjusting the screen size of the vehicle display device may include: when a use a rear side monitoring function is requested from the user, enlarging the screen size of the vehicle display device into a third stage size into a second direction.

In one form, determining the vehicle driving condition may include: determining at least one of whether a vehicle is in an autonomous driving mode, whether a rear side monitoring function is requested, whether a navigation function is used, and whether a multimedia function is used.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
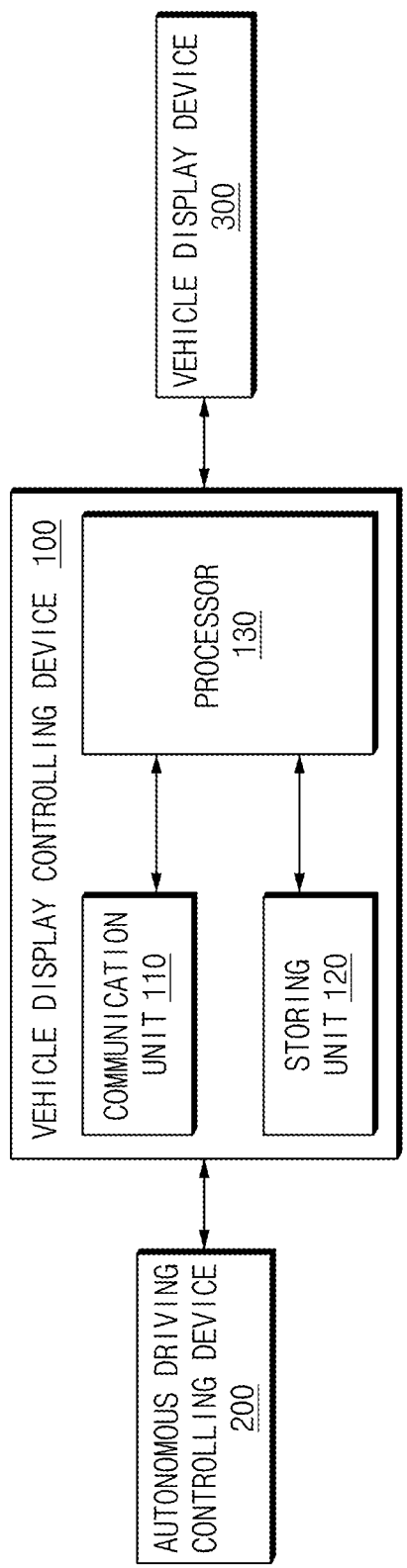
FIG. 1 is a block diagram showing a configuration of a vehicle system including a device for controlling a vehicle display device.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Further, in describing the form of the present disclosure, a detailed description of the related known configuration or function will be omitted when it is determined that it interferes with the understanding of the form of the present disclosure.

In describing the components of the form according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, forms of the present disclosure will be described in detail with reference to FIG. 1 to FIG. 14.

FIG. 1 is a block diagram showing a configuration of a vehicle system including a device for controlling a vehicle display device according to an exemplary form of the present disclosure. The device 100 for controlling a vehicle display device of FIG. 1 may be mounted in a vehicle, and may be mounted in an autonomous driving vehicle, or a normal driving vehicle, respectively.

The vehicle system may include the device 100 for controlling a vehicle display device, an autonomous driving controlling device 200, and a vehicle display device 300.

The device 100 for controlling a vehicle display device may determine a driving condition of the vehicle (autonomous driving mode, normal driving mode), and adjust a screen size of the vehicle display device based on the determination result or a user requirement (requests of use of navigation function, multimedia function, rear side monitoring function, and the like). Accordingly, the device 100 for controlling a vehicle display device may adjust the screen size of the vehicle display device depending on whether the vehicle is in the autonomous driving mode, whether the rear side monitoring request is received, whether the navigation function is used, or whether the multimedia function is used, and the like. In addition, in case of the normal driving vehicle, the device 100 for controlling a vehicle display device may adjust the screen size of the vehicle display device based on the user requirement (whether the rear side monitoring request is received, whether the navigation function is used, or whether the multimedia function is used).

To this end, the device 100 for controlling a vehicle display device may include a communication device 110, a storage 120, and a processor 130.

The communication device 110 is a hardware device implemented in various electronic circuits for transmitting and receiving signals via a wireless or wired connection. In the present disclosure, the communication device 110 may perform in-vehicle communication via a CAN communication, or the like, and may communicate with the autonomous driving controlling device 200, the vehicle display device 300, and the like.

The storage 120 may store results determined by the processor 130, and the like. The storage 120 may include at least one type of a storage medium of at least one type of memory such as a flash memory type, a hard disk type, a micro type, and a card type (for example, an SD card (Secure Digital Card) or an XD card (eXtream Digital Card)) memory, and the like, and a RAM (Random Access Memory), SRAM (Static RAM), ROM (Read Only Memory), PROM (Programmable ROM), EEPROM (Electrically Erasable PROM), MRAM (Magnetic RAM), a magnetic disk, and an optical disk type memory.

The processor 130 may be electrically connected to the communication device 110, and the storage 120, and may electrically control each component. In addition, the processor 130 may be an electrical circuit that executes instructions of software, thus various data processing and calculations described below may be performed. The processor 130 may be, for example, an ECU (electronic control unit) or a low-level controller, mounted in the vehicle.

Figure 3:
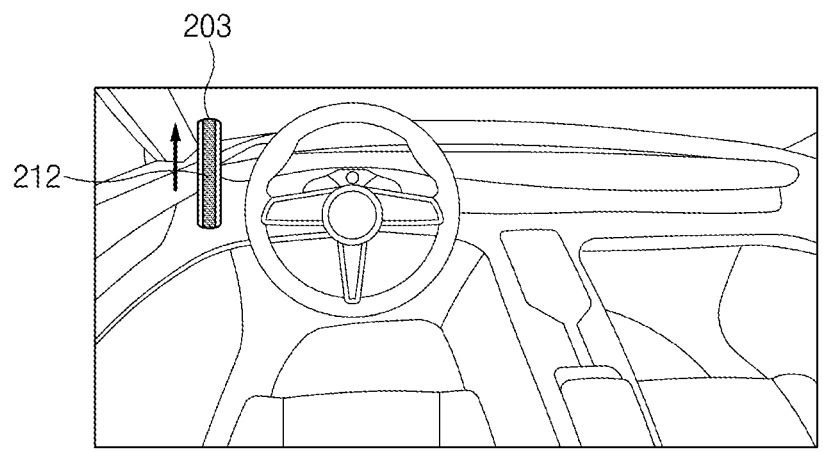
FIG. 3 shows an exemplary view in which a vehicle display device is opened.

The processor 130 may turn off the vehicle display device 300 when the vehicle is turned off or in the autonomous driving mode. On the one hand, in the autonomous driving mode, the processor 130 may turn on, but not enlarge the vehicle display device 300. In this connection, in the autonomous driving mode, when the vehicle display device 300 is inserted in the vehicle as a hidden type, it may be kept open as shown in FIG. 3.

The processor 130 may enlarge a screen size of the vehicle display device 300 into a first stage size in a first direction in deactivation of the autonomous driving mode. That is, the processor 130 may enlarge the screen size of the vehicle display device 300 by a cluster size to the right.

After the autonomous driving mode is deactivated, and when the use of the navigation function or the multimedia function is requested from the user, the processor 130 may further enlarge the screen size of the vehicle display device enlarged into the first stage size to the right into the second stage size to the right. That is, the screen size of the vehicle display device 300 may be further enlarged by an AVN (Audio, Video, Navigation) size after enlarged by the cluster size to the right. That is, after the autonomous driving mode is deactivated, and when the use of the navigation function or the multimedia function is requested from the user, the processor 130 may enlarge the screen size of the vehicle display device 300 by the sum of the cluster size and the AVN size. In this connection, the cluster, and the AVN described as an example of the screen size of the vehicle display device 300 are not limited to one form, and may be implemented as a display having various sizes. That is, the enlargement into the first stage size may include an enlargement of the size enough to display vehicle driving information. In addition, the enlargement into the second stage size may include an enlargement of the size for playing the multimedia such as a photograph and a video.

After the autonomous driving mode is deactivated, and when the use of the navigation function or the multimedia function is requested from the user, the processor 130 may enlarge the screen size of the vehicle display device into the first stage size in the first direction and then further enlarge the screen size of the vehicle display device from the first stage size to the second stage size in a first direction. Then, when the use of the rear side monitoring function is requested from the user, the processor 130 may further enlarge the screen size of the vehicle display device into the third size in a second direction. That is, after an autonomous driving mode is deactivated, and when use of a navigation function or a multimedia function, and a rear side monitoring function are requested from the user, the processor 130 may enlarge the screen size of the vehicle display device 300 by a sum of the cluster size and the AVN size to the right, and enlarge the screen size of the vehicle display device 300 by a size smaller than the AVN size to the left. In this connection, the first stage enlarged size, the second stage enlarged size, and the third stage enlarged size depending on the vehicle driving condition may not be limited to the size described in the present disclosure, and may be changed at any time as needed.

When the use of the rear side monitoring function is requested from the user after the autonomous driving mode is deactivated, the processor 130 may enlarge the screen size of the vehicle display device into the first stage size in the first direction, and then enlarge the size of the display into the third stage size in the second direction.

The processor 130 may determine whether the vehicle is in the autonomous driving mode depending on whether a Highway Driving Assist (HDA) button is ON or OFF. The processor 130 may determine that requests of use have occurred when the navigation destination is set and the multimedia function is turned on. In addition, the processor 130 may determine that a request of use of the rear side monitoring function has occurred when a rear side monitoring switch (BWM) is turned on, or a left-turn signal is active.

The autonomous driving controlling device 200 may activate or deactivate the autonomous driving mode depending on the ON/OFF of the Highway Driving Assist (HDA) button. In addition, the autonomous driving controlling device 200 may provide the result of the activation or deactivation of the autonomous driving mode to the device 100 for controlling a vehicle display device.

The vehicle display device 300 may display the vehicle driving information (for example, surrounding obstacle information, collision prediction information, vehicle speed, charge amount, remaining fuel amount, and the like), the rear side video information, the multimedia information, the navigation information (for example, route to destination, and the like), and the like, and may provide functions other than the photograph and the video. The vehicle display device 300 may include at least one of a flexible display (FD), a bended display, and a 3D display. In addition, the vehicle display device 300 may be implemented as a foldable flexible display module, a windable flexible display module, and a rollable display module which may be folded or wound by the user.

Further, the vehicle display device 300 may be implemented as a transparent display made to be transparent or optically transparent so as to view the outside. Still further, the vehicle display device 300 may be provided as a touch screen including a touch panel, and may be used as an input device in addition to an output device.

The present technology may increase a user convenience by controlling the vehicle display device, by which a display of a rollable type provides a display size depending on an autonomous driving mode and a normal driving mode.

Especially, driving assist function may be performed in the autonomous driving mode by increasing or maximizing sense of openness at the front by winding the vehicle display device in a roll shape to reduce or minimize the screen size so that only desired information for the user is provided. In addition, driving assist function may be performed in the normal driving mode by increasing or maximizing the screen of the vehicle display device to provide all the driving-related information.

Further, when the vehicle in which the device 100 of the present disclosure is mounted is the autonomous driving vehicle, the device 100 may adjust the screen size of the vehicle display device depending on the vehicle driving condition (autonomous driving mode, normal driving mode (human driving mode)). On the other hand, when the vehicle in which the device 100 of the present disclosure is mounted is the normal driving vehicle (human driving vehicle), the screen size of the vehicle display device may be adjusted depending on the user requirement (use of the navigation, use of the multimedia, use of the rear side monitoring function, and the like).

Figure 2:
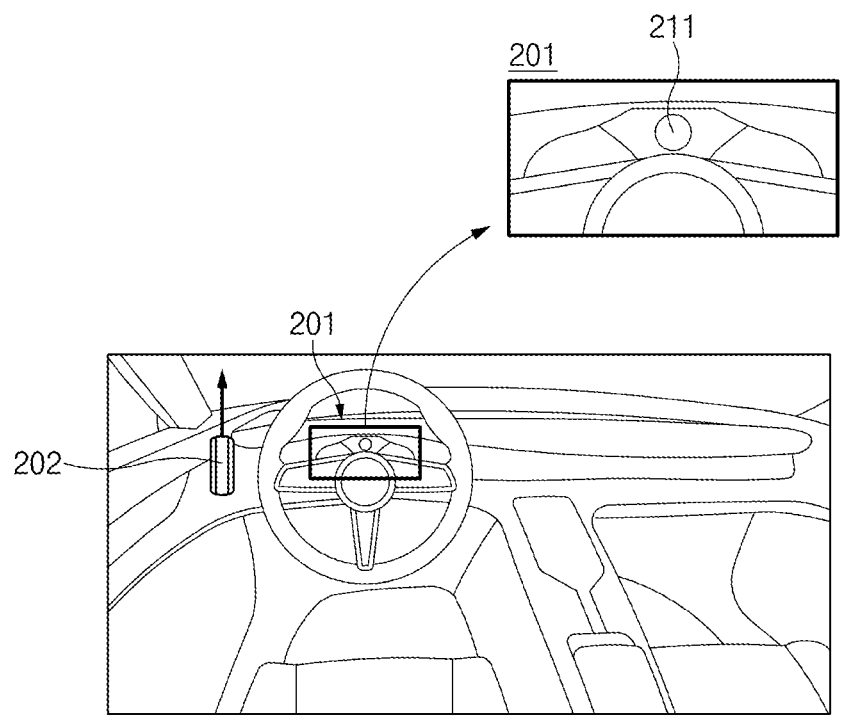
FIG. 2 is a diagram illustrating an exemplary operation of a vehicle display device in an autonomous driving mode.

FIG. 2 is a diagram illustrating an exemplary operation of the vehicle display device in the autonomous driving mode according to another form of the present disclosure. With reference to FIG. 2, a rod-shaped rolling mechanism 202 of the vehicle display device is located in front of the vehicle, and is located between the left side of a steering wheel and a driver's seat door. When the vehicle is turned off, or in the autonomous driving mode, the rod-shaped rolling mechanism 202 of the vehicle display device may be mounted as the hidden type with all or partly inserted in the vehicle as shown in FIG. 2. However, the rod-shaped rolling mechanism 202 of the vehicle display device is not limited to the hidden type, but may be formed as an open type protruding as shown in FIG. 3. Further, the vehicle display device 300 as a rollable display may occupy a vehicle area as much as the rod-shaped rolling mechanism in which the display is in wound. When the rod-shaped rolling mechanism 202 of the vehicle display device is inserted into the vehicle in a rolled state as shown in FIG. 2, the front of the driver's seat is opened, and a driving-related alarm may be displayed on a display unit 201. The display unit 201 may include a camera 211 for detecting a driver status, and a warning lamp in front of the driver's seat.

FIG. 3 shows an exemplary view in which the vehicle display device according to one form of the present disclosure is opened. FIG. 3 shows a state in which a vehicle display device 203 inserted in the vehicle is opened and protruded upward. The vehicle display device 300 may be opened in start-up of the vehicle or in the autonomous driving mode. In the autonomous driving mode, when the vehicle display device 300 isn't opened, the display unit 201 in FIG. 2 may display desired information (minimum regulation, driving-related information, and the like), and a display unit is provided on a cross section of the rod-shaped rolling mechanism 203 of the vehicle display device to display the desired information (minimum regulation, driving-related information, and the like) in the autonomous driving. In addition, when the vehicle display device 300 is enlarged by a minimum size in the autonomous driving, the display may also provide the user with minimal information (for example, minimal regulation, driving-related information, and the like) through the minimum screen.

Figure 4:
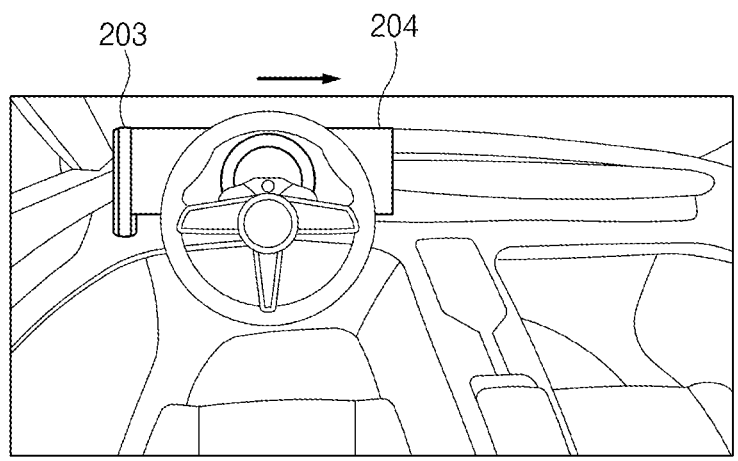
FIG. 4 is an exemplary view in which a vehicle display device is enlarged into a first stage size in a first direction.

FIG. 4 is an exemplary view in which the vehicle display device is enlarged into the first stage size in the first direction. It was confirmed that the vehicle display device 300 is enlarged to the right, that is, in the passenger seat direction. In this connection, the enlargement into the first stage size 204 may be performed when the autonomous driving mode is deactivated, and self-driving is adopted, or when the user wants to display additional information (driving information, and the like). In the enlargement into the first stage size, the vehicle display device 300 may be enlarged by a size of a conventional cluster, a head-up display, and the like.

Figure 5:
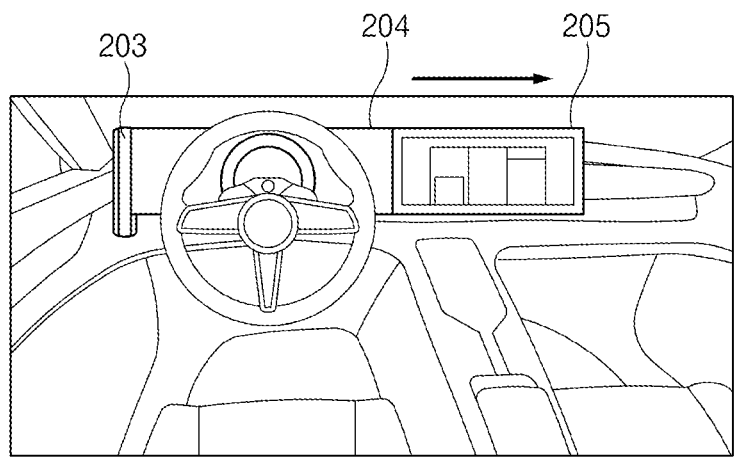
FIG. 5 is an exemplary view in which a vehicle display device is enlarged into a second stage size in a first direction.

FIG. 5 is an exemplary view in which the vehicle display device is enlarged into the second stage size in the first direction. With reference to FIG. 5, it was confirmed that the vehicle display device enlarged into the first stage size is further enlarged to the right, that is, in the passenger seat direction. In this connection, the enlargement into the second stage size 205 may be performed when the user sets the navigation destination or requests the multimedia contents play while the autonomous driving mode is deactivated. In the enlargement into the second stage size, the vehicle display device 100 may be enlarged by the conventional AVN size.

Figure 6:
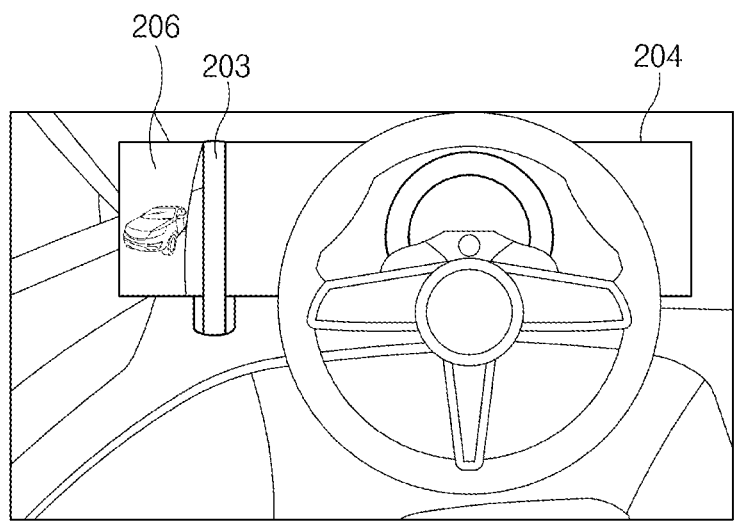
FIG. 6 is an exemplary view in which a vehicle display device is enlarged into a third stage size in a second direction.

FIG. 6 is an exemplary view in which the vehicle display device is enlarged into the third size in the second direction. With reference to FIG. 6, an example is shown in which the vehicle display device 300 is enlarged to the left direction, that is, the door direction.

In this connection, the enlargement into the third stage size 206 may be performed upon receiving the rear side monitoring request from the user. A size increase of the screen of the vehicle display device 100 in the third stage may be smaller than each of the size increases of the screen of the vehicle display device 100 in the first and second stages. In this connection, the vehicle display device 300 may be enlarged into the third stage size without enlarged into the first stage size. Further, the enlargement into the third stage size may be performed when the autonomous driving mode is deactivated and the rear side monitoring function is used while the navigation device and the multimedia device are not used.

Figure 7:
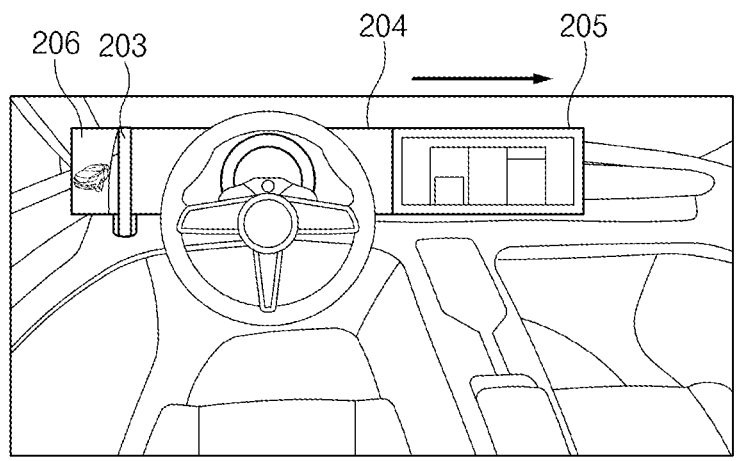
FIG. 7 is an exemplary view in which a vehicle display device is enlarged into a fourth stage size in a first direction and a second direction.

FIG. 7 is an exemplary view in which the vehicle display device is enlarged into a fourth stage size in the first direction and the second direction. With reference to FIG. 7, the enlargement into the fourth stage size means that all of the enlargement into the first stage size 204, the enlargement into the second stage size 205, and the enlargement into the third stage size 206 are performed. That is, the vehicle display device 300 is maximally enlarged to the left and right. In this connection, the enlargement into the fourth stage size may be performed when the autonomous driving mode is deactivated, the navigation device and the multimedia device are used, and the rear side monitoring function is used. However, in the autonomous driving mode, when the use of the rear side monitoring function is requested, only the enlargement into the third stage size 206 may be performed.

Figure 8:
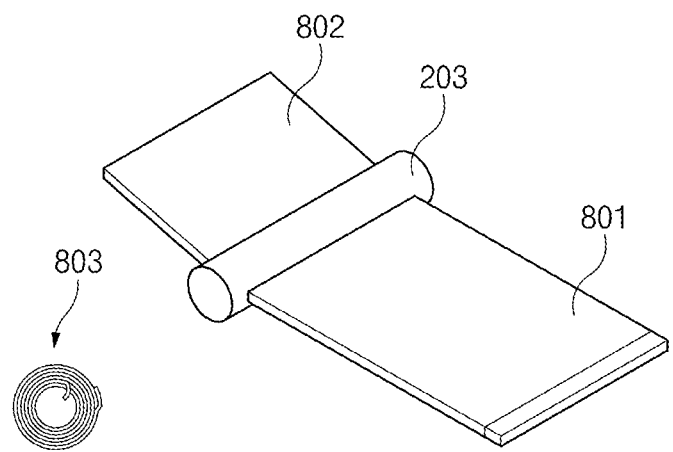
FIG. 8 is an exemplary view of a vehicle display device.

FIG. 8 is an exemplary view of the vehicle display device according to another form of the present disclosure.

With reference to FIG. 8, the vehicle display device 300 includes a rod-shaped rolling mechanism 203 for rolling and winding display screens, and display screens 801, 802 that are wound within the rod-shaped rolling mechanism 203. In this connection, the display screen 801 may be enlarged to the right around the rod-shaped rolling mechanism 203, and the display screen 802 may be enlarged to the left. Reference numeral 803 denotes a rolled-up cross section of the rod-shaped rolling mechanism 203, which illustrates an example in which the display screens are rolled-up on the cylindrical rod.

Figure 9:
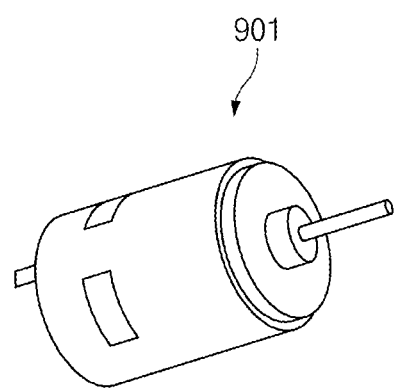
FIG. 9 is an exemplary view of a drive motor of a vehicle display device.

FIG. 9 is an exemplary view of a drive motor for the vehicle display device according to one form of the present disclosure. With reference to FIG. 9, a driving motor 901 is provided at a bottom or at a top of the rod-shaped rolling mechanism 203 to roll or unroll the display screens 801 and 802. In this connection, two driving motors 901 may be provided to correspond to two enlargement directions.

Figure 10:
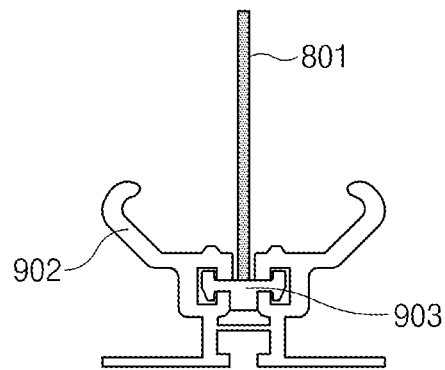
FIG. 10 is a structural view of a rail of a rollable display.

FIG. 10 is a structural view of a rail of the rollable display according to another form. With reference to FIG. 10, the rail structure in the rod-shaped rolling mechanism 203 includes a rail body 902 surrounding a rail moving portion 903 and the rail moving portion 903 for moving a display screen. The display screen 801 is fixed to the rail moving portion 903, and the rail moving portion 903 moves the rail body 902 along the display screen via a force by which the driving motor 901 pushes and pulls the display screen 801.

Figure 11:
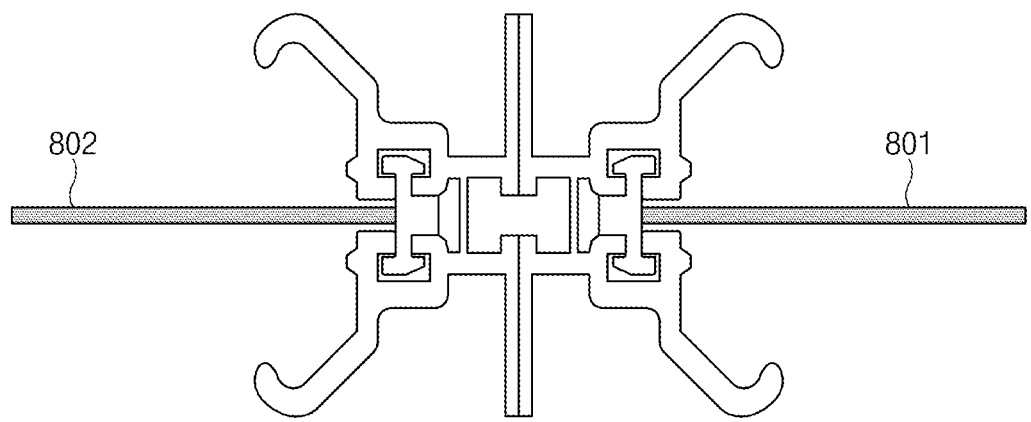
FIG. 11 is a structural view of a rail of a bidirectional rollable display.

FIG. 11 is a structural view of a rail of a bidirectional rollable display according to another exemplary form of the present disclosure. With reference to FIG. 11, the rail structure in which the display screen is enlarged to the left and right like the present disclosure.

Figure 12:
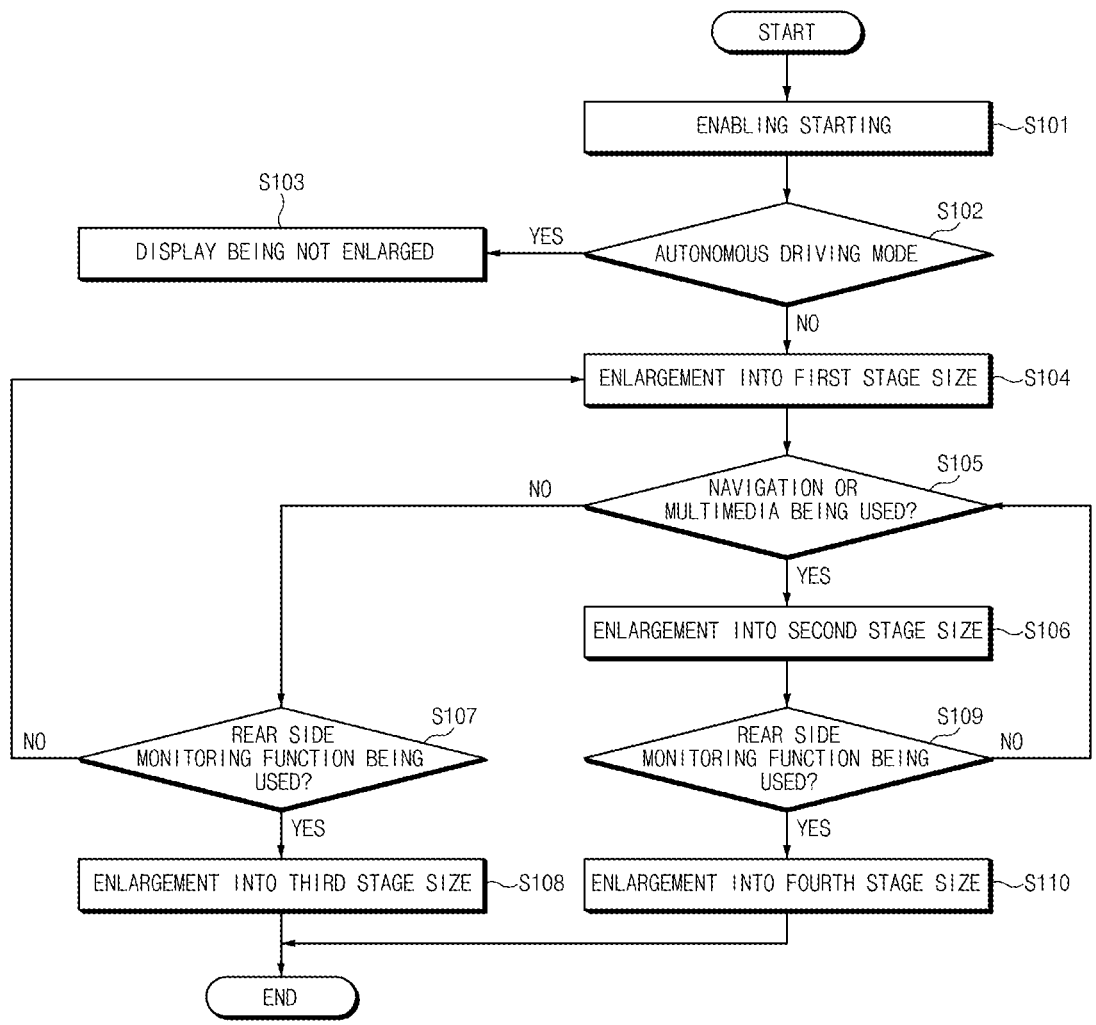
FIG. 12 is a flowchart for explaining a method for controlling a vehicle display device.

Hereinafter, a method for controlling the vehicle display device according to an exemplary form of the present disclosure will be described in detail with reference to FIG. 12. FIG. 12 is a flowchart for explaining the method for controlling the vehicle display device according to one form of the present disclosure.

Hereinafter, it is assumed that the device 100 of FIG. 1 performs a process of FIG. 12. Further, in the description of FIG. 12, it may be understood that operations described as being performed by the device are controlled by the processor 130 of the device 100.

With reference to FIG. 12, when the vehicle starting is abled in S101, in operation S102, the device 100 for controlling a vehicle display device determines whether the vehicle is currently in the autonomous driving mode. At this time, the device 100 for controlling a vehicle display device may determine whether the vehicle is in the autonomous driving mode by cooperating with the autonomous driving controlling device 200. In one example, when the highway driving assist (HDA) button is turned on, the device 100 for controlling a vehicle display device may determine that the vehicle is in the autonomous driving mode.

When the vehicle is currently in the autonomous driving mode, the device 100 for controlling a vehicle display device does not drive and enlarge the hidden vehicle display device 300 (S103). FIG. 2 shows the vehicle display device 300 as the hidden type hidden in the vehicle when the vehicle startup is off. Further, FIG. 3 shows an example of the hidden type vehicle display device 300 opened and protruded upward. In the autonomous driving mode, the vehicle display device may maintain the hidden state as shown in FIG. 2, or may be opened but not enlarged to the left and right and provide a minimum amount of information using the display unit 201 at the front of the vehicle as shown in FIG. 3.

To the contrary, when the vehicle is not in the autonomous driving mode, the device 100 for controlling a vehicle display device drives the vehicle display device 300 by opening vehicle display device 300 and enlarging the size thereof into the first stage size in a right direction S104. In this connection, the first stage enlarged size may be defined as a screen size of the existing cluster as shown in FIG. 4, but may be not limited thereto.

In one example, the device 100 for controlling a vehicle display device determines whether the request of use of the navigation information or the multimedia information has occurred from the user (S105). That is, when the navigation device receives the destination location or the multimedia device (for example, radio, music player, and the like) is turned on, the device 100 for controlling a vehicle display device may determine that the request of use of the navigation information or use of the multimedia information has occurred from the user.

When the request of use of the navigation information or the multimedia information has occurred from the user, the device 100 for controlling a vehicle display device may enlarge the screen size of the vehicle display device 300 into the second stage size (S106). In this connection, a size to be enlarged into the second stage size may be defined as a screen size that is enlarged by the size of the AVN (Audio, Video, Navigation) after enlarged into the first stage size, but is not limited thereto.

In one example, when the request of use of the navigation information or the multimedia information has not occurred from the user, the device 100 for controlling a vehicle display device determines whether the request of use of the rear side monitoring function has occurred (S107). At this time, when the rear side monitoring button (BVM) is turned on or off or the left-turn signal is active, the device 100 for controlling a vehicle display device may determine that the request of use of the rear side monitoring function has occurred from the user.

When the request of use the rear side monitoring function has occurred, the device 100 for controlling a vehicle display device may enlarge the screen size of the vehicle display device 300 into the third stage size (S108). In this connection, as shown in FIG. 6, the enlargement into the third stage size means that the vehicle display device 300 is enlarged into the first stage size and then is further enlarged into the third stage size to the left.

In one example, after the display enlargement into the second stage size in operation S106, the device 100 for controlling a vehicle display device additionally determines whether the request of use the rear side monitoring function has occurred (S109). Then, when the request of use the rear side monitoring function has occurred, the screen size of the vehicle display device 300 may be enlarged into the fourth stage size (S110). In this connection, as shown in FIG. 7, in the enlargement into the fourth stage size, the vehicle display device 300 may be enlarged to the left and right up to the maximum value.

Thus, the present disclosure may improve the openness of the vehicle by providing the display of an optimum size desired by the user depending on the vehicle driving condition. In addition, when information is desired, the present disclosure may provide various information through the vehicle display device by adjusting the size of the display based on the desired information. Further, the present disclosure may provide the multimedia function to a fellow passenger sitting in the passenger seat.

Figure 13:
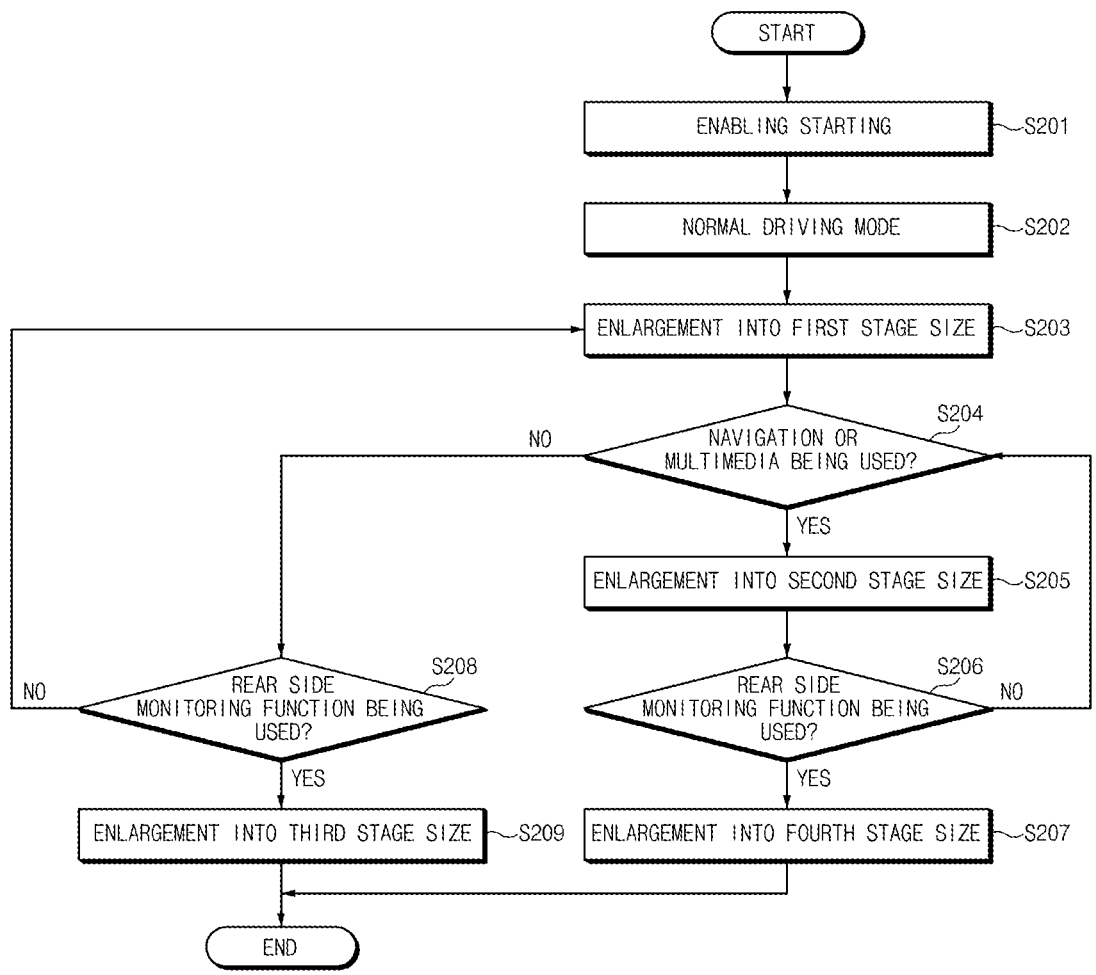
FIG. 13 is a flowchart for explaining a method for controlling a vehicle display device.

Hereinafter, a method for controlling the vehicle display device according to another form of the present disclosure will be described in detail with reference to FIG. 13. FIG. 13 is a flow chart for explaining the method for controlling the vehicle display device according to another form of the present disclosure. FIG. 13 shows the method for controlling the vehicle display device in which the vehicle is the normal driving vehicle rather than the autonomous driving vehicle. Hereinafter, it is assumed that the device 100 of FIG. 1 performs the process of FIG. 13. In addition, in the description of FIG. 13, it is understood that the operations described as being performed by the device are controlled by the processor 130 of the device 100.

With reference to FIG. 13, when the vehicle starting is abled on (S201), and starts to travel in the normal driving mode (S202), the device 100 for controlling a vehicle display device drives the vehicle display device 300 by opening the vehicle display 300 and enlarging the size thereof into the first stage size to the right (S203). In this connection, the first stage enlarged size may be defined as a screen size of the existing cluster as shown in FIG. 4, but may not be limited thereto.

In one example, the device 100 for controlling a vehicle display device determines whether the request of use of the navigation information or the multimedia information has occurred from the user (S204). That is, when the navigation device receives the destination location or the multimedia device (for example, radio, music player, and the like) is turned on, the device 100 for controlling a vehicle display device may determine that the request of use of the navigation information or use of the multimedia information has occurred from the user.

When the request of use of the navigation information or the multimedia information has occurred from the user, the device 100 for controlling a vehicle display device may enlarge the screen size of the vehicle display device 300 into the second stage size (S205). In this connection, a size to be enlarged into the second stage size may be defined as a screen size that is enlarged by the size of the AVN (Audio, Video, Navigation) after enlarged into the first stage size, but is not limited thereto.

In one example, when the request of use of the navigation information or the multimedia information has not occurred from the user, the device 100 for controlling a vehicle display device determines whether the request of use of the rear side monitoring function has occurred (S208). At this time, when the rear side monitoring button (BVM) is turned on or off or the left-turn signal is active, the device 100 for controlling a vehicle display device may determine that the request of use of the rear side monitoring function has occurred from the user.

When the request of use the rear side monitoring function has occurred, the device 100 for controlling a vehicle display device may enlarge the screen size of the vehicle display device 300 into the third stage size (S209). In this connection, as shown in FIG. 6, the enlargement into the third stage size means that the vehicle display device 300 is enlarged into the first stage size and then is further enlarged into the third stage size to the left.

In this connection, after the display enlargement into the second stage size in operation S205, the device 100 for controlling a vehicle display device additionally determines whether the request of use the rear side monitoring function has occurred (S206). Then, when the request of use the rear side monitoring function has occurred, the screen size of the vehicle display device 300 may be enlarged into the fourth stage size (S207). In this connection, as shown in FIG. 7, in the enlargement into the fourth stage size, the vehicle display device 300 may be enlarged to the left and right up to the maximum value.

Figure 14:
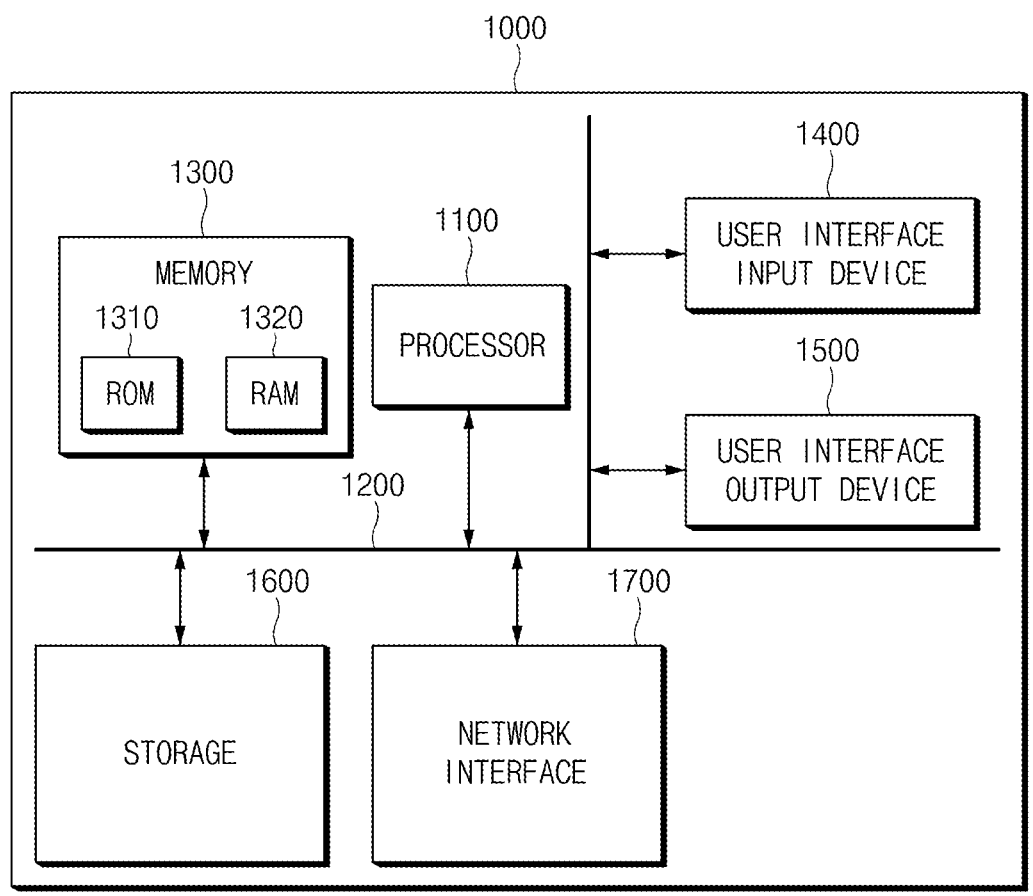
FIG. 14 illustrates a computing system.

FIG. 14 illustrates a computing system according to an exemplary form of the present disclosure.

With reference to FIG. 14, the computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU), or a semiconductor device that executes processing for instructions stored in the memory 1300 and/or the storage 1600. The memory 1300 and the storage 1600 may include various types of volatile or nonvolatile storage media. For example, the memory 1300 may include a ROM (Read Only Memory), and a RAM (Random Access Memory).

Thus, the steps of the method or the algorithm described in connection with the forms disclosed herein may be embodied directly in hardware, in a software module, or in a combination of the two executed by processor 1100. The software module may reside in a storage medium (for example, the memory 1300 and/or the storage 1600) such as a RAM memory, a flash memory, a ROM memory, an EPROM memory, an EEPROM memory, a register, a hard disk, a removable disk, and a CD-ROM.

The exemplary storage medium is coupled to the processor 1100, which may read information from, and write information to, the storage medium. Alternatively, the storage medium may be integral with the processor 1100. The processor and the storage medium may reside in an application specific integrated circuit (ASIC). The ASIC may reside in a user terminal. Alternatively, the processor and the storage medium may reside as separate components in the user terminal.

The description above is merely illustrative of the technical idea of the present disclosure, and various modifications and changes may be made by those skilled in the art without departing from the characteristics of the present disclosure.

Therefore, the forms disclosed in the present disclosure are not intended to limit the technical idea of the present disclosure but to illustrate the present disclosure, and the scope of the technical idea of the present disclosure is not limited by the forms. The scope of the present disclosure should be construed as being covered by the scope of the appended claims, and all technical ideas falling within the scope of the claims should be construed as being included in the scope of the present disclosure.

The present technology may distinguish the autonomous driving mode and the normal driving mode and provide the vehicle display device by adjusting the screen size of the vehicle display device depending on the driving mode using the rollable display, thereby increasing a user convenience.

In addition, various effects that are directly or indirectly grasped through this document may be provided.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for controlling a vehicle display device, the controlling device comprising:
a processor configured to adjust a screen size of the vehicle display device based on a vehicle driving condition and an input from a user; and
a storage configured to store information determined by the processor, wherein:
  the vehicle driving condition includes an autonomous driving mode and a normal driving mode, and
  the input from the user includes at least one of a request of use of a navigation function, a request of use of a multimedia function, and a request of use of a rear side monitoring function, and
wherein after the autonomous driving mode is deactivated, and when the use of the navigation function or the multimedia function, and the rear side monitoring function are requested from the user, the processor is configured to:
  physically enlarge the screen size of the vehicle display device into a first stage size in a first direction, and subsequently and physically enlarge the first stage size of the screen size into a second stage size in the first direction, and
  physically enlarge the second stage size of the screen size of the vehicle display device into a third stage size in a second direction.

2. The controlling device of claim 1, wherein when a vehicle starting is turned off, or when the vehicle driving condition is the autonomous driving mode, the processor is configured to turn off the vehicle display device.

3. The controlling device of claim 1, wherein the first direction and the second direction are opposite to each other.

4. The controlling device of claim 1, wherein when a rear monitoring switch is turned on or a left-turn signal is activated, the processor is configured to determine that request of the use of the rear side monitoring function has occurred.

5. The controlling device of claim 1, wherein when, after deactivation of the autonomous driving mode, request from the user to use the rear side monitoring function is received without the request to use the navigation function or the multimedia function, the processor is configured to physically enlarge the screen size of the vehicle display device into the first stage size in the first direction, and subsequently into the third stage size.

6. A vehicle system comprising:
  a vehicle display device configured to roll a display screen; and
  a controlling device configured to control the vehicle display device,
  wherein the controlling device is configured to adjust a screen size of the vehicle display device depending on a vehicle driving condition and an input from a user,
wherein:
  the vehicle driving condition includes an autonomous driving mode and a normal driving mode, and
the input from the user includes at least one of a request of use of a navigation function, a request of use of a multimedia function, and a request of use of a rear side monitoring function,
the vehicle display device includes:
  a first display screen to be physically enlarged in a first direction when the autonomous driving mode is deactivated;
  a second display screen to be subsequently and physically enlarged in a second direction when the autonomous driving mode is deactivated, and when the use of the navigation function or the multimedia function, and the rear side monitoring function are requested from the user; and
  a rod-shaped rolling mechanism configured to roll the first display screen and the second display screen.

7. The vehicle system of claim 6, wherein the rod-shaped rolling mechanism includes:
  a driving motor configured to extend and roll the first display screen and the second display screen;
  a rail moving portion configured to fix the first and second display screens, wherein the rail moving portion is movable by the driving motor; and
  a rail body surrounding the rail moving portion.

8. A method for controlling a vehicle display device, the method comprising:
  determining, by a processor, a vehicle driving condition; and
  adjusting, by the processor, a screen size of the vehicle display device based on the determined vehicle driving condition, and a user input,
wherein:
  the vehicle driving condition includes an autonomous driving mode and a normal driving mode,
  the user input includes at least one of a request of use of a navigation function, a request of use of a multimedia function, and a request of use of a rear side monitoring function, and
wherein adjusting the screen size of the vehicle display device includes:
  after the autonomous driving mode is deactivated, and when the use of the navigation function or the multimedia function, and the rear side monitoring function are requested from a user,
  physically enlarging the screen size of the vehicle display device into a first stage size in a first direction;
  subsequently and physically enlarging the first stage size of the screen size into a second stage size in the first direction; and
  physically enlarging the second stage size of the screen size of the vehicle display device into a third stage size in a second direction.

9. The method of claim 8, wherein adjusting the screen size of the vehicle display device includes:
  when a vehicle starting is turned off, or when the vehicle driving condition is in the autonomous driving mode, turning off the vehicle display device.

10. The method of claim 8, wherein determining the vehicle driving condition includes:
  determining at least one of whether the vehicle is in the autonomous driving mode, whether the rear side monitoring function is requested, whether the navigation function is used, or whether the multimedia function is used.

* * * * *